United States Patent [19]
Schicketanz

[11] 3,870,395
[45] Mar. 11, 1975

[54] CONNECTING PLUG FOR OPTICAL GLASS FIBERS

[75] Inventor: Dieter Schicketanz, Munich, Germany

[73] Assignee: Siemens Aktiengesellschaft, Berlin and Munich, Germany

[22] Filed: July 5, 1973

[21] Appl. No.: 376,345

[30] Foreign Application Priority Data
July 10, 1972 Germany............................ 2233916

[52] U.S. Cl. .............................. 350/96 C, 350/96 R
[51] Int. Cl. .............................................. G02b 5/14
[58] Field of Search............ 350/96 R, 96 B, 96 WG

[56] References Cited
UNITED STATES PATENTS

| | | | |
|---|---|---|---|
| 3,315,160 | 4/1967 | Goodman..................... | 350/96 R X |
| 3,455,625 | 7/1969 | Brumley et al.................... | 350/96 B |
| 3,579,316 | 5/1971 | Dyott et al. ............... | 350/96 WG X |
| 3,734,594 | 5/1973 | Trambarulo...................... | 350/96 B |
| 3,740,158 | 6/1973 | Bellinger et al............... | 350/96 R X |
| 3,768,146 | 10/1973 | Braun et al. .................. | 350/96 R X |

Primary Examiner—David H. Rubin
Attorney, Agent, or Firm—Hill, Gross, Simpson, Van Santen, Steadman, Chiara & Simpson

[57] ABSTRACT

A connecting plug for optical glass fibers includes a capillary tube having a reduced central dimension slightly larger than the outer diameter of a pair of glass fibers to be connected, and an index of refraction approximately equal to that of the outer surface of the glass fibers. The interior of the capillary tube is filled with a fluid having an index of refraction approximately equal to that of the central portions of the glass fibers, and the ends of the two fibers are in contact with each other within the tube. A pair of elastic caps is provided at the ends of the capillary tube in order to form a fluid tight seal for retaining the fluid therein.

4 Claims, 1 Drawing Figure

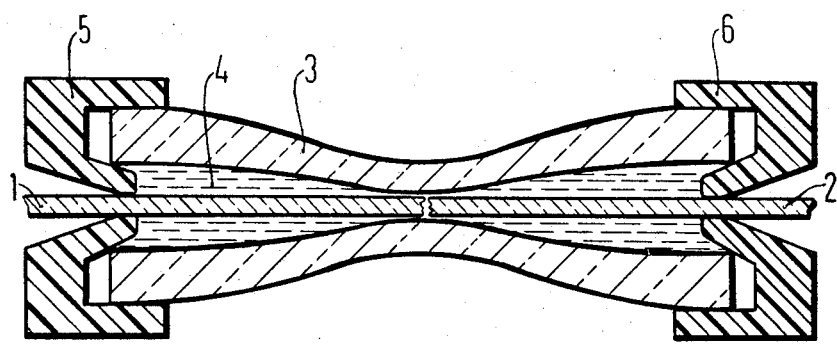

CONNECTING PLUG FOR OPTICAL GLASS FIBERS

BACKGROUND

1. Field of the Invention

The present invention relates to optical glass fibers and, more particularly, to apparatus for interconnecting the ends of two separate fibers to establish an efficient light transmitting connection therebetween.

2. The Prior Art

It has been known in the art to connect the end of one glass fiber to the end of another fiber by fusing the two fibers together, so that the two fibers are transformed, in effect, into a single fiber in which the transmitting medium is continuous. This gives rise to a permanent connection between the two fibers. However, there has not been developed in the art an effective way of establishing a temporary connection between two glass fibers to enable the light transmitted through one of such fibers to be subsequently transmitted through the other without substantial attenuation and scattering. Placing the ends of the two fibers in contact with each other, in an air environment, is not satisfactory, in that appreciable scattering occurs at the glass-air interface of each of the fibers, thereby substantially attenuating the light energy.

SUMMARY OF THE INVENTION

It is the principle object of the present invention to provide a simple and effective means for establishing a temporary connection between two optical glass fibers to permit light energy to be efficiently transmitted from one of the fibers to the other.

Another object of the present invention is to provide a means whereby a permanent connection may be established between the fibers if desired, without the necessity of fusing the fibers together.

A further object of the present invention is to provide a method of producing a connector by which two glass fibers may be joined end-to-end on a temporary bases, while establishing an efficient light transmitting connection therebetween.

These and other objects and advantages of the present invention will become manifest upon an examination of the following description and the accompanying drawing.

In one embodiment of the present invention, there is provided a capillary tube formed of material having an index of refraction approximately equal to that of casing material of the glass fibers, and a central portion of reduced cross section slightly larger than the diameters of said fibers, to receive the ends of two glass fibers from opposite ends of said capillary tube, said two ends contacting each other within said capillary tube, and the space surrounding said fibers within said capillary tube being filled with a material having an index of refraction approximately equal to the interior of the glass fiber.

BRIEF DESCRIPTION OF THE DRAWING

Reference will now be made to the accompanying drawing, which illustrates in a longitudinal crosssectional view an illustrative embodiment of the present invention.

DESCRIPTION OF THE PREFERRED EMBODIMENT

As shown in the drawing, the two fibers to be interconnected are a fiber 1 and a fiber 2. They are received within opposite ends of a capillary tube 3, having a central portion of reduced crosssectional area such that the diameter of the interior of the tube 3 at its reduced portion is slightly greater than the diameter of the fibers 1 and 2. The two ends of the fibers 1 and 2 are in contact with each other, although they are shown slightly out of contact in the drawing in the interest of clarity. Preferably, the diameter of the reduced central portion of the capillary tube 3 is approximately 5 percent greater than the diameter of the fibers 1 and 2.

The tapered arrangement of the capillary tube 3, opening into portions of increased cross section at its two ends, facilitates insertion of the fibers 1 and 2 into the tube 3. The tube 3 is formed of material having an index of refraction approximately equal to that of the casing of the fibers 1 and 2. The interior of the tube 3, surrounding the tubes 1 and 2, is filled with fluid 4 having an index of refraction approximately equal to that of the interior of the glass fibers 1 and 2.

As a result of the indentity between the indexes of refraction of the interiors of the fibers 1 and 2 and the fluid 4, the light is neither scattered nor attenuated as it passes between the two fibers 1 and 2. The presence of the interior wall of the tube 3 at the joint between the two ends of the fibers 1 and 2 and the identity of its index of refraction with that of the casing of the fibers 1 and 2 reflects light impinging thereon with the same efficiency as the outer casing of the fibers 1 and 2 and, in effect, simulates a continuous casing bridging the joint between the ends of the fibers 1 and 2.

The opposite ends of the tube 3 are closed by elastic sleeves 5 and 6, respectively. The sleeves are formed of any synthetic or plastic elastic material, and function simply to provide a fluid tight seal at opposite ends of the tube 3, to prevent the escape of the fluid 4. The sleeves 5 and 6 also function to resist any tension applied to the fibers 1 and 2 which might tend to separate them from their contacting position within the tube 3. This is accomplished by the sleeves 5 and 6 frictionally bearing on the exterior surfaces of the fibers 1 and 2 to resist movement of the fibers relative to the sleeves. To assist in this function, each of the sleeves 5 and 6 is provided with a conical recess in the outer surface thereof, and a small aperture is located at the apex of such conical recess. The fibers 1 and 2 may be inserted into the conical recess and through the aperture, thereby stretching the material of the sleeves surrounding the aperture and deforming it sufficiently to permit insertion of the fiber. The deformation of the sleeve material insures a force between the sleeve and the fiber which gives rise to the frictional force which resists relative movement between the sleeve and the fiber.

The concial recess configuration is effective in providing a greater resistance to outward motion of the fibers 1 and 2 than to inward motion thereof, so that insertion is facilitated, but the risk of accidental removal of fibers 1 and 2 is minimized. The friction is not so great, however, as to prevent the fibers 1 and 2 from being withdrawn from the tube 3 if it is desired to separate the connection.

If desired, the apparatus shown in the drawing can serve to establish a permanent joint between the two fibers 1 and 2. This is advantageously achieved by using a fluid 4 which contains an adhesive which hardens after the fibers 1 and 2 have been inserted into the position illustrated. The sleeves 5 and 6 may be removed after the adhesive has hardened, if desired. Canadian balsam is one such adhesive which may be used, when the fibers 1 and 2 have indexes of refraction approximately equal thereo.

The connecting means of the present invention may advantageously be used to establish connections between individual pairs of bundles of fibers, by employing a separate capillary tube 3 for each pair of fibers to be joined. In some circumstances, it may be desirable to mount a plurality of such tubes in side-by-side relation, on a common supporting member or bracket, to maintain the connected fibers in a particular order in relation to each other.

The capillary tube 3 is advantageously formed by heating the central portion thereof and drawing its two ends apart, thereby slightly stretching and reducing the cross section of the heated central portion. This process is conveniently carried out by means of an automatic machine, so that all of the tubes 3 produced thereby are uniform.

The fibers 1 and 2 have been described as being of the type having a central core and an outer casing. Such fibers may be of the type formed of a central rod with an encircling coating of material having a lower index of refraction, or may be of the type in which the index of refraction gradually increases inwardly from the outer surface.

What is claimed is:

1. A reusable connecting plug for connecting two optical glass fibers in light transmitting relationship, said fibers each having a central core surrounded by a casing, said core having a higher index of refraction than said casing, said plus comprising a rigid capillary tube having an inner diameter slightly greater than the outer diameter of the fibers to be connected, the inner diameter of said tube increasing gradually towards the ends thereof, said tube being adapted to receive two glass fibers inserted into opposite ends thereof, said fibers adapted to contact each other at the reduced portion of said tube, said capillary tube having an index of refraction equal to that of said casing.

2. Apparatus according to claim 1, including a pair of elastic sleeve members, said sleeve members being received in opposite ends of said tube to close said tube in air tight relationship, each of said sleeve members having a central aperture provided therein for receiving one of said fibers.

3. Apparatus according to claim 1, in which said tube is filled with fluid material having an index of refraction equal to that of said core.

4. Apparatus according to claim 3, wherein said fluid contains an adhesive so that, upon hardening, a permanent connection is established between said tube fibers.

* * * * *